US011728691B2

(12) United States Patent
AbuKhalaf et al.

(10) Patent No.: US 11,728,691 B2
(45) Date of Patent: Aug. 15, 2023

(54) COMMUNICATION BETWEEN DEVICES IN A WIRELESS CHARGING SYSTEM

(71) Applicant: Apple Inc., Cupertino, CA (US)

(72) Inventors: Zaid A. AbuKhalaf, San Jose, CA (US); Alexei E. Kosut, Campbell, CA (US)

(73) Assignee: Apple Inc., Cupertino, CA (US)

(*) Notice: Subject to any disclaimer, the term of this patent is extended or adjusted under 35 U.S.C. 154(b) by 362 days.

(21) Appl. No.: 16/953,960

(22) Filed: Nov. 20, 2020

(65) Prior Publication Data
US 2021/0376628 A1 Dec. 2, 2021

Related U.S. Application Data

(60) Provisional application No. 63/030,027, filed on May 26, 2020, provisional application No. 63/030,018, filed on May 26, 2020.

(51) Int. Cl.
H02J 7/00 (2006.01)
H02J 50/80 (2016.01)
(Continued)

(52) U.S. Cl.
CPC .......... H02J 50/80 (2016.02); H02J 7/00032 (2020.01); H02J 7/02 (2013.01); H02J 50/10 (2016.02); H02J 50/12 (2016.02); H02J 50/40 (2016.02); H02J 50/60 (2016.02); H04B 5/0037 (2013.01); H04B 5/0075 (2013.01); H04L 5/0044 (2013.01); H04L 41/12 (2013.01); H04L 61/50 (2022.05); H04W 40/00 (2013.01); H04W 40/246 (2013.01); H04W 88/04 (2013.01); H04W 88/02 (2013.01)

(58) Field of Classification Search
USPC .......................... 320/106, 107, 108, 109, 110
See application file for complete search history.

(56) References Cited

U.S. PATENT DOCUMENTS 8,798,537 B2   8/2014  Lee et al.
10,236,722 B2  3/2019  Lee et al.
(Continued)

FOREIGN PATENT DOCUMENTS

CN   105490314 B    4/2019
WO   2019036061 A1  2/2019

Primary Examiner — Brian Ngo
(74) Attorney, Agent, or Firm — Treyz Law Group, P.C.; Joseph F. Guihan

(57) ABSTRACT

A wireless power system may include wireless power transmitting devices, wireless power receiving devices, and wireless power transmitting and receiving devices. The devices in the wireless power system may exchange packets in order to transfer various types of data. The data may be transmitted using in-band communication (e.g., amplitude-shift keying modulation or frequency-shift keying modulation). The devices may use locally assigned addresses to communicate with any other device in the wireless power system. Even if a first device is not inductively coupled to a second device, the locally assigned addresses may identify an inductive coupling path from the first device to the second device that includes at least one intervening device. The first device may therefore communicate with the second device using in-band communication packets that are relayed by at least one intervening device.

20 Claims, 16 Drawing Sheets

(51) Int. Cl.
*H02J 50/10* (2016.01)
*H02J 50/12* (2016.01)
*H02J 50/40* (2016.01)
*H02J 50/60* (2016.01)
*H02J 7/02* (2016.01)
*H04B 5/00* (2006.01)
*H04L 5/00* (2006.01)
*H04L 41/12* (2022.01)
*H04W 40/00* (2009.01)
*H04L 61/50* (2022.01)
*H04W 88/04* (2009.01)
*H04W 40/24* (2009.01)
*H04W 88/02* (2009.01)

(56) References Cited

U.S. PATENT DOCUMENTS

| | | | |
|---|---|---|---|
| 10,411,831 B2 * | 9/2019 | Plumb | H03M 5/145 |
| 10,581,491 B2 | 3/2020 | Won et al. | |
| 10,601,257 B2 | 3/2020 | Won et al. | |
| 10,658,880 B2 | 5/2020 | Kim et al. | |
| 10,840,747 B2 | 11/2020 | Shichino | |
| 2004/0166812 A1 | 8/2004 | Lumelsky | |
| 2012/0331316 A1 | 12/2012 | Liu et al. | |
| 2018/0145544 A1 | 5/2018 | Park et al. | |
| 2018/0167224 A1 | 6/2018 | Brandt | |
| 2018/0175672 A1 | 6/2018 | Yoden | |
| 2018/0278099 A1 | 9/2018 | Hong et al. | |
| 2019/0199403 A1 | 6/2019 | Won et al. | |
| 2019/0214852 A1 | 7/2019 | Park | |
| 2019/0232808 A1 | 8/2019 | Besard et al. | |
| 2019/0238000 A1 | 8/2019 | Salvekar et al. | |
| 2019/0296799 A1 * | 9/2019 | Park | H02J 50/80 |
| 2019/0312459 A1 | 10/2019 | Garbus et al. | |
| 2020/0274401 A1 * | 8/2020 | Park | H02J 50/402 |
| 2020/0278733 A1 | 9/2020 | Li et al. | |
| 2020/0336021 A1 | 10/2020 | Park | |
| 2022/0239347 A1 | 7/2022 | Choi et al. | |

* cited by examiner

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | DEVICE 0 TYPE ||||||||
| $B_1$ | DEVICE 0 ADDRESS ||||||||
| $B_2$ | DEVICE 1 TYPE ||||||||
| $B_3$ | DEVICE 1 ADDRESS ||||||||
| ••• | ••• ||||||||
| $B_N$ | DEVICE N ADDRESS ||||||||

*FIG. 8*

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | MODE | BROADCAST | RESERVED ||| STREAM NUMBER |||
| $B_1$ | SOURCE ADDRESS ||||||||
| $B_2$ | DESTINATION ADDRESS ||||||||

*FIG. 9*

| $b_0$ | BRANCH NUMBER | $b_1$ | BRANCH NUMBER | $b_2$ | BRANCH NUMBER | $b_3$ | BRANCH NUMBER | $b_4$ | BRANCH NUMBER | $b_5$ | BRANCH NUMBER | $b_6$ | BRANCH NUMBER | $b_7$ | BRANCH NUMBER | $B_0$ |

*FIG. 10*

COMMUNICATION BETWEEN DEVICES IN A WIRELESS CHARGING SYSTEM

This application claims the benefit of provisional patent application No. 63/030,018, filed May 26, 2020, and provisional patent application No. 63/030,027, filed May 26, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system may include one or more wireless power transmitting devices, one or more wireless power receiving devices, and one or more wireless power transmitting and receiving devices. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power. The wireless power transmitting and receiving device may include at least one coil and both wireless power transmitting circuitry and wireless power receiving circuitry.

The devices in the wireless power system may exchange packets in order to transfer various types of data. Authentication data, firmware data, command data, configuration data, and/or power data may be transmitted between the devices in the wireless power system. The data may be transmitted using in-band communication (e.g., amplitude-shift keying modulation or frequency-shift keying modulation).

The devices may use locally assigned addresses to communicate with any other device in the wireless power system. Even if a first device is not inductively coupled to a second device, the locally assigned addresses may identify an inductive coupling path from the first device to the second device that includes at least one intervening device. The first device may therefore communicate with the second device using in-band communication packets that are relayed by at least one intervening device. Each device in the wireless power system may maintain a list of all other devices in the network. Each other device in the network may be assigned a respective address that is indicative of the inductive coupling path to that device.

BRIEF DESCRIPTION OF THE DRAWINGS

FIG. 8 is a diagram showing an illustrative packet structure for a device list that may be exchanged between devices in a wireless power system in accordance with an embodiment.

FIG. 9 is a diagram showing an illustrative packet header that may be used to identify a stream number, source address, and destination address in accordance with an embodiment.

FIG. 10 is a diagram showing an address that may be used in packets in a wireless power system in accordance with an embodiment.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a device such as a wrist watch, cellular telephone, tablet computer, laptop computer, or other electronic equipment, as examples. The wireless power transmitting and receiving device may be an electronic device case (e.g., a case for a cellular telephone) or other type of electronic device. The wireless power transmitting device may wirelessly transmit power to a wireless power receiving device. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

Figure 1:
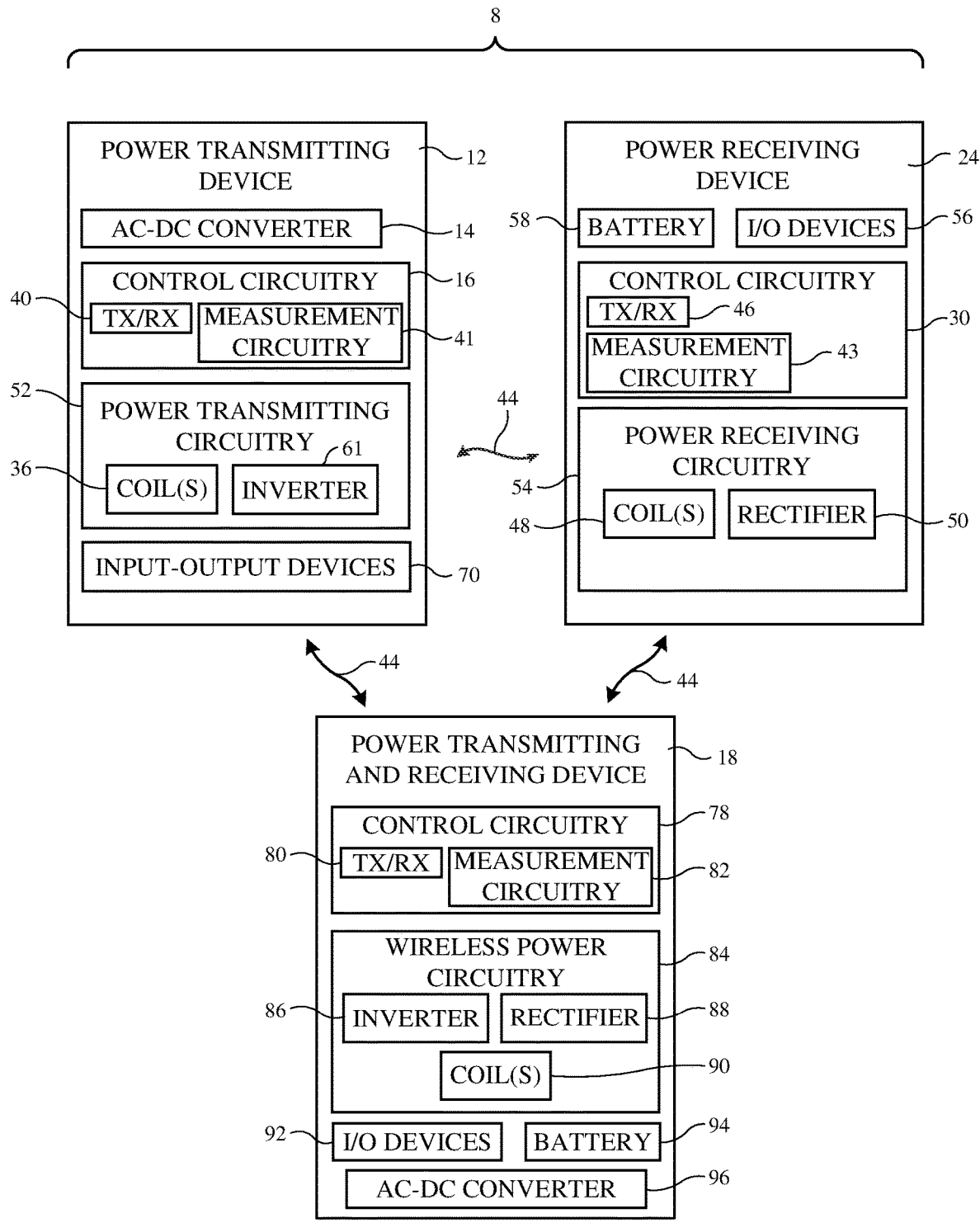
FIG. 1 is a schematic diagram of an illustrative wireless power system in accordance with an embodiment.

An illustrative wireless power system (wireless charging system) is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power such as wireless power transmitting and receiving device 18. It should be understood that one or more of each type of device may be present in the wireless power system at any given time, with devices being added and removed from the system in a fluid manner. The function of power transmitting and receiving 18 may change depending upon the arrangement of the system at a given time. A power transmitting and receiving device may only transmit power in some scenarios, may only receive power in some scenarios, and may both transmit and receive power in some scenarios. A power transmitting device 12 may transmit power directly to a power receiving device 24 in some scenarios. In other scenarios, power transmitting device 12 may transmit power to a power transmitting and receiving device 18, which then transmits the power to power receiving device 24. The functionality of each device and inductive coupling between each device within the system may be updated as devices are added to and removed from the system.

Wireless power transmitting device 12 includes control circuitry 16. Wireless power receiving device 24 includes control circuitry 30. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. In other words, one or more of coils 36 is inductively coupled to one or more of coils 48. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may optionally have one or more input-output devices 70 (e.g., input devices and/or output devices of the type described in connection with input-output devices 56). Device 18 may optionally have one or more input-output devices 92 (e.g., input devices and/or output devices of the type described in connection with input-output devices 56).

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90.

Frequency-shift keying (FSK) and/or amplitude-shift keying (ASK) may be used to convey in-band data between devices 12, 18, and 24. Power may be conveyed wirelessly during these FSK and ASK transmissions.

It is desirable for power transmitting device 12, power transmitting and receiving device 18, and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coil(s) 36 and other circuitry of device 12. The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 18 or 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can determine whether wireless power is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8.

Power transmitting and receiving device 18 may be a wireless charging mat or puck that is coupled to a power adapter or other equipment by a cable, may be equipment that has been incorporated into furniture, a vehicle, or other system, may be a removable battery case, may be a portable electronic device such as a wrist watch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. For example, transmitting device 12 may transmit power to device 24 and device 18 (while device 18 does not separately transmit power to device 18). In another example, transmitting device 12 transmits power to device 18, which transmits power to 24 (without direct exchange of power from device 12 to device 24).

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay received power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all used for both wireless power transmission and wireless power reception. Different coils in device 18 may optionally be shorted together in different modes of operation.

Figure 2:
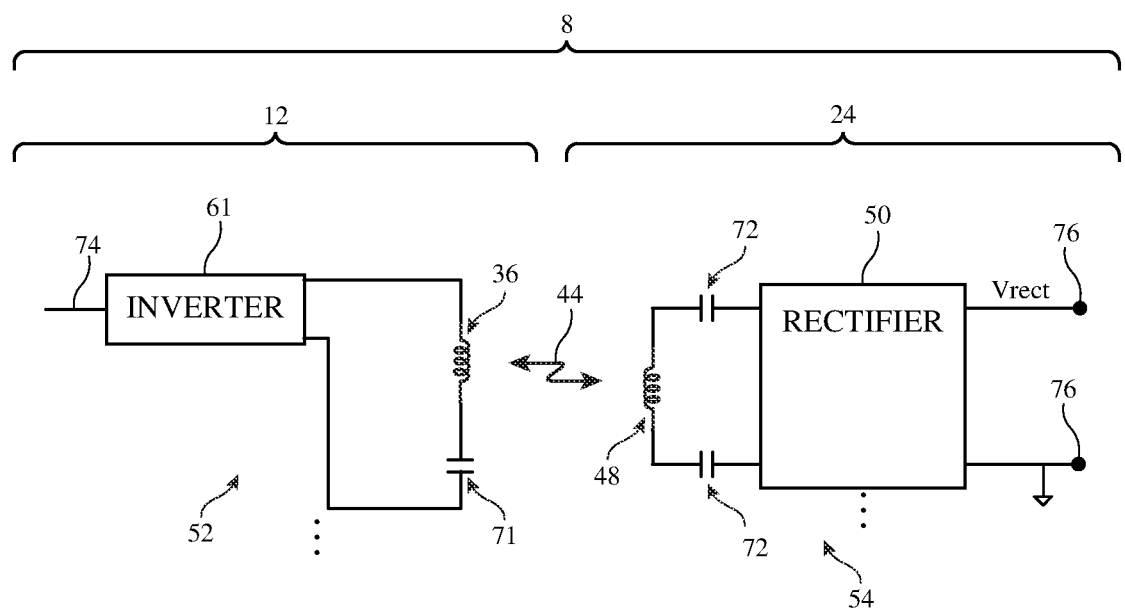
FIG. 2 is a circuit diagram of illustrative wireless power transmitting and receiving circuitry in accordance with an embodiment.

FIG. 2 is a circuit diagram of illustrative wireless charging circuitry for system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180° out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12.

The power transmission frequency used for transmission of wireless power may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power.

The aforementioned FSK and ASK modulation and demodulation techniques may be used to transmit data packets between any two devices within system 8. Each data packet may include numerous data bits (sometimes referred to as bits). The data bits may be grouped into bytes, with each byte including any desired number of bits (e.g., 8 bits).

Data packets may be transmitted between devices in a data stream. There are many types of data that may be transmitted between a wireless power transmitting device and a wireless power receiving device. As examples, transmitted data may include authentication data, a firmware update, a command, configuration data, power data (e.g., received power levels, states of charge, etc.) or any other desired type of data.

Authentication may occur when inductive coupling is initiated between two devices (e.g., when the wireless power receiving device is placed on the wireless power transmitting device). Authentication may involve verifying that the wireless power receiving device is supported by the wireless power transmitting device and/or verifying that the wireless power receiving device and the wireless power transmitting device belong to the same user (e.g., both devices are associated with the same user identification). Authentication may also involve establishing encryption to protect the transmitted data. These examples are merely illustrative and other information may be transmitted during authentication.

A firmware update may be, for example, transmitted between the devices in system 8 (e.g., from a wireless power receiving device to a wireless power transmitting device). Commands may be transmitted between the devices in system 8. An exemplary command that may be transmitted is an instruction to update a user-interface. For example, the wireless power transmitting device may transmit a command to the wireless power receiving device with an instruction to indicate that wireless power transfer has commenced (e.g., using an input-output device 56 of the wireless power receiving device such as a display or camera flash).

Configuration data may, for example, be transmitted from the wireless power transmitting device to the wireless power receiving device. The configuration data may include information regarding the configuration of the wireless power transmitting device (e.g., the model number and shape of the wireless power transmitting device).

To summarize, there are many different types of data that may be transmitted between devices 12, 18, and 24. However, in some communication schemes, there may only be one active data stream per communication direction using in-band communication between the devices. This limits the devices to transmitting only one type of data at a time. Data packets may be transmitted using the data stream until all of the pertinent data packets have been successfully transmitted. After the transmission is complete, transmission of additional packets of a different type may begin. This type of communication scheme may have limited flexibility. Once transmission of a first type of data begins, transmission must continue until all of that data has been transmitted (even if there is high priority data of a different type to be transmitted).

Consider an example where a wireless power receiving device is placed on a wireless power transmitting device. When the power receiving device is placed on the power transmitting device, authentication may begin (with authentication data being transmitted between devices 12 and 24). A single data stream may be used to transmit the authentication data. In the meantime, devices 12 and 24 may wish to exchange data regarding a user-interface update. However, since only one active data stream is permitted, the authentication must be completed before the user-interface update commands are exchanged. In other words, data transfer of different types must be completed serially.

To increase flexibility of data communication, a communication scheme may be used that allows for multiple active data streams. This allows for more control over the transmission of different types of information. In the above example, transmission of authentication data using a first data stream may be paused and data regarding the user-interface update may be transmitted using a second data stream. Once the data regarding the user-interface update is transmitted, the transmission of authentication data using the first data stream may be resumed.

Additionally, it may be desirable for a given device within the system to be able transmit data to any other device within the system. For example, consider a scenario in which power transmitting device 12 is inductively coupled to device 18, device 18 is inductively coupled to power receiving device 24, and power transmitting device 12 is not inductively coupled to power receiving device 24. It may be desirable for power transmitting device 12 to send data to power receiving device 24. However, because power transmitting device 12 and power receiving device 24 are not inductively coupled, power transmitting device 12 cannot send data directly to power receiving device 24 using in-band communication.

To increase flexibility of communication within the system, packets exchanged within the system may have information identifying a destination address within the system. For example, power transmitting device 12 may produce a packet intended for device 24. The packet may include information identifying device 24. Power transmitting device 12 may transmit the packet to device 18 using in-band communication. However, because of the address information, device 18 transmits the packet to the intended destination of power receiving device 24 using in-band communication. In this way, power transmitting device 12 can transmit desired information to power receiving device 24, even though they are not inductively coupled.

The communication scheme for system 8 may therefore allow for multiple concurrent data streams as well as packet transmission between any two devices in the system (regardless of whether or not they are inductively coupled). The packets may be transmitted using in-band communication. To allow for multiple concurrent data streams, each packet may include stream identifying information in a header. To allow packet transmission between any two devices in the system, an addressing scheme based on the topology of the communication network may be used.

Figure 3A:
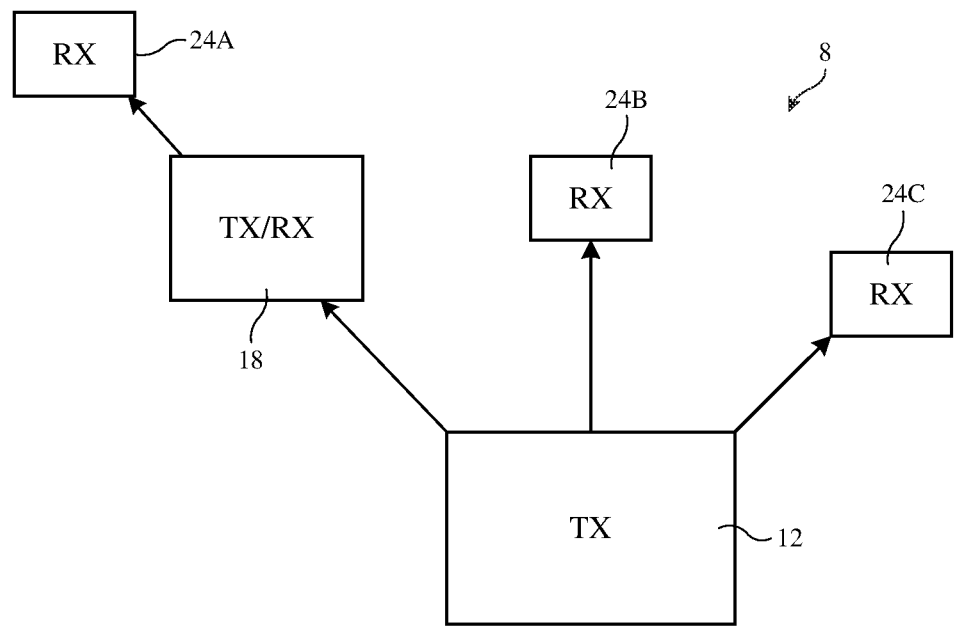
FIG. 3A is a diagram of a wireless power system including a power transmitting device, a power transmitting and receiving device, and three power receiving devices in accordance with an embodiment.

FIG. 3A is a schematic diagram showing an illustrative arrangement for system 8. As shown, there may be one wireless power transmitting device 12 that transmits wireless power to wireless power transmitting and receiving device 18 as well as wireless power receiving devices 24B and 24C. Wireless power transmitting and receiving device 18 receives power from transmitter 12 and transmits power to wireless power receiving device 24A.

Figure 3B:
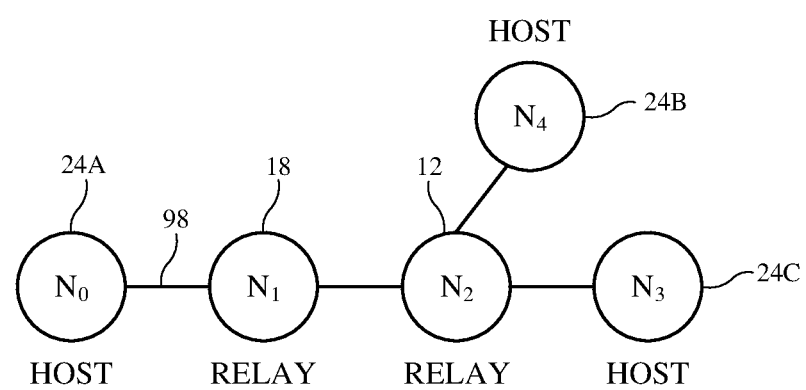
FIG. 3B is a network diagram corresponding to the wireless power system of FIG. 3A in accordance with an embodiment.

FIG. 3B is a network diagram of the system of FIG. 3A. The network diagram shows the topology of the communication network for system 8, which may be used as the basis for the addressing scheme that enables packet distribution throughout the system. As shown in FIG. 3B, each device within the system is represented as a respective node within the network. Power receiving device 24A is represented as node $N_0$, power transmitting and receiving device 18 is represented as node $N_1$, power transmitting device 12 is represented as node $N_2$, power receiving device 24C is represented as node $N_3$, and power receiving device 24B is represented as node $N_4$. The nodes are connected by links 98, with each link representing an inductive coupling between the nodes. The link 98 between nodes may sometimes be referred to as an inductive link, inductive coupling, inductive coupling link, interface, inductive interface, etc.

In-band communication may be used for bi-directional communication over each inductive link 98. In one illustrative arrangement, the devices transmitting wireless power over the inductive link use FSK modulation to convey packets over the inductive link and the devices receiving wireless power over the inductive link use ASK modulation to convey packets over the inductive link. In general, the devices may communicate in-band (e.g., using coils) over the inductive link using any desired modulation scheme.

Each node may be either a relay node or a host node. Each host node (sometimes referred to as an endpoint node) is only linked to one other node within the network. For example, node $N_0$ is a host node that is only linked to node $N_1$. Host node $N_4$ is only linked to one other node ($N_2$). Host node $N_3$ is only linked to one other node ($N_2$). Relay nodes, on the other hand, may be linked to at least two other nodes within the network. For example, relay node $N_1$ is linked to nodes $N_0$ and $N_2$. Relay node $N_2$ is linked to nodes $N_1$, $N_3$, and $N_4$.

Functionally, the host nodes may be used to receive, process, and send packets over their single link. In other words, the host nodes are used to send packets to and receive packets from the single device to which it is inductively coupled. For example, consider host node $N_0$. Host node $N_0$ may transmit packets to node $N_1$ using the inductive link between $N_0$ and $N_1$. Host node $N_0$ may receive packets from node $N_1$ using the inductive link between $N_0$ and $N_1$. However, because $N_0$ is only inductively coupled to $N_1$, $N_0$ cannot send in-band communication packets directly to any of the other nodes within the network.

The relay nodes are capable of relaying packets from one node to another (e.g., between two hosts). For example, relay node $N_1$ may receive a packet from host node $N_0$ and transmit that packet to relay node $N_2$. Similarly, relay node $N_1$ may receive a packet from relay node $N_2$ that is then transmitted to host node $N_0$. The relay nodes may therefore be used to distribute packets within the network to desired destinations.

The communication network associated with system 8 may have an associated network depth and a branching limit. Network depth may refer to the maximum supported number of links between any two nodes in the network. Branching limit refers to the maximum supported number of nodes directly connected to a single relay. In FIG. 3B, there are three links separating node $N_0$ from node $N_3$. Therefore, a network depth of three is required to support the network of FIG. 3B. Relay node $N_2$ is linked to three other nodes. Therefore, a branching limit of three is required to support the network of FIG. 3B.

As previously mentioned, the topology of the network may be used as the basis of the addressing scheme for communication within the system. This type of communication scheme allows for simple and fast communication between any two nodes in the network, without relying on unique device identifiers (which may require more data and may include more identifying information than is required for inter-device communication within the network).

The topology of the network may be determined anytime there is an inductive link added or removed from the network. The process of determining the topology of the network may be referred to as a network discovery process. At the end of the network discovery process, each device in the network may have an internal device list that includes all of the other devices in the network as well as their relative positions within the network.

Figure 4A:
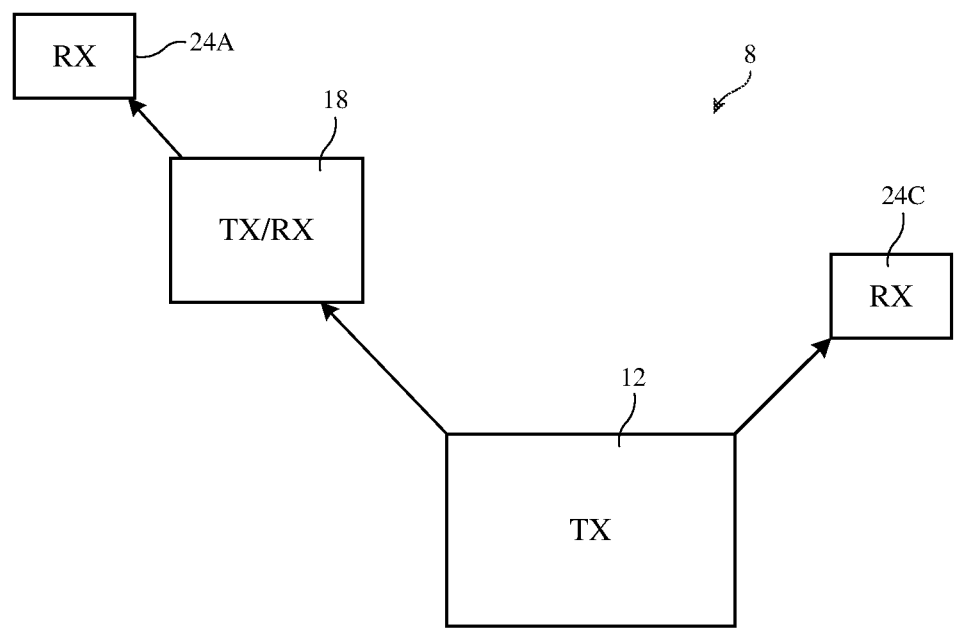
FIG. 4A is a diagram of a wireless power system including a power transmitting device, a power transmitting and receiving device, and two power receiving devices in accordance with an embodiment.
Figure 4B:
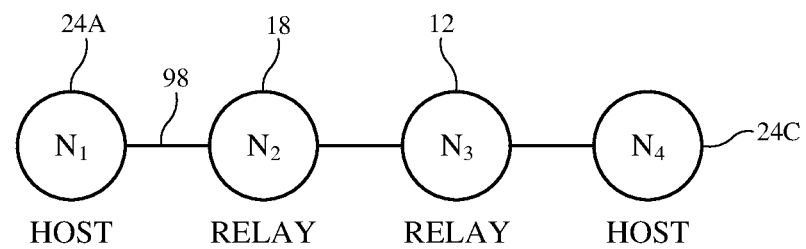
FIG. 4B is a network diagram corresponding to the wireless power system of FIG. 4A in accordance with an embodiment.

Consider the example of FIGS. 4A and 4B. In the schematic diagram of FIG. 4A, power receiving device 24B has been removed from the system (relative to the schematic diagram of FIG. 3A). The network diagram associated with the system of FIG. 4A is shown in FIG. 4B. As shown in FIG. 4B, there are four total devices within the network. Therefore, the network discovery process will provide each device with a list of the other three devices in the network as well as addresses for the other three devices based on the position of the devices within the network.

Figure 5:
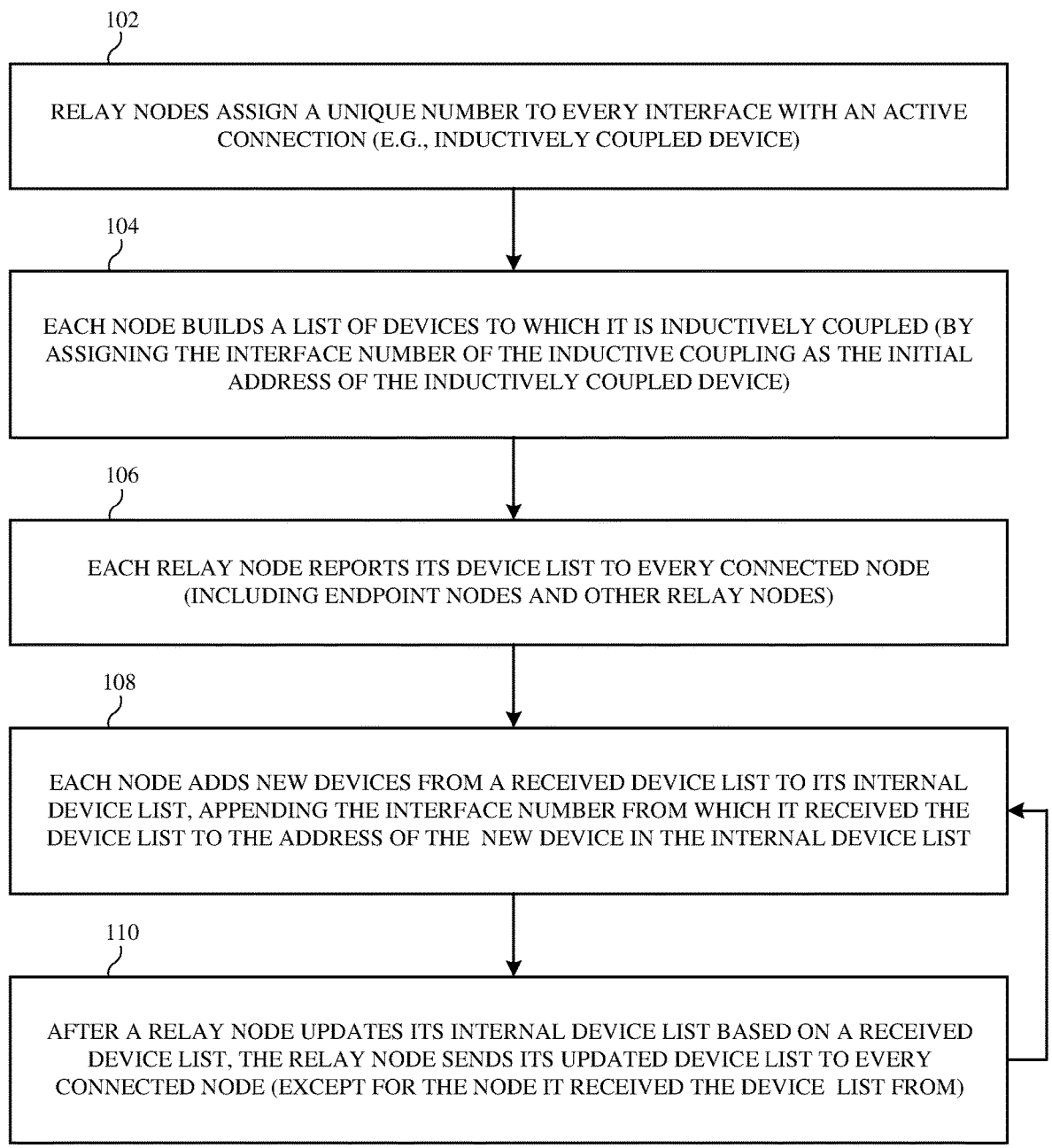
FIG. 5 is a flowchart showing illustrative operations involved in a network discovery process for a wireless power system in accordance with an embodiment.

FIG. 5 is a flow chart of illustrative operations involved in the network discovery process that occurs each time a device is added or removed from the communication network. FIGS. 6A-6E are diagrams showing various steps of the network discovery process. During the operation of block 102, the relay nodes assign a unique number to every interface with an active connection. In other words, each relay node assigns a unique number to each inductive link it has with another device in the network.

Figure 6A:
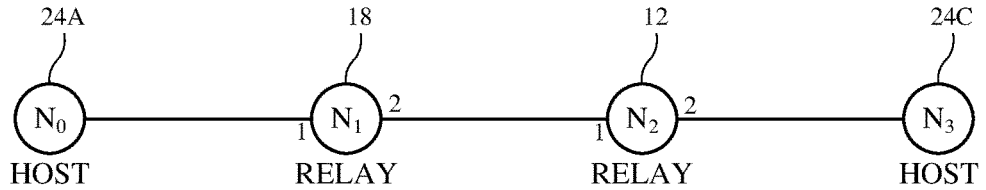
FIGS. 6A-6E are diagrams showing various steps of the network discovery process of FIG. 5 in accordance with an embodiment.

As shown in FIG. 6A, power transmitting and receiving device 18 is relay node $N_1$ in the network and power transmitting device 12 is relay node $N_2$ in the network. Each of these nodes therefore assigns a unique number to each inductive link present. Node $N_1$ has two inductive links (one with node $N_0$ and one with node $N_2$). It therefore assigns each of these two inductive links a unique number. The unique number may be determined randomly. The magnitude of the number is not critical, only that the different links have different identifiers of some kind. In FIG. 6A, relay node $N_1$ assigns the link with node $N_0$ as number '1' and the link with node $N_2$ as number '2'.

Node $N_2$ also has two inductive links (one with node $N_1$ and one with node $N_3$). It therefore assigns each of these two inductive links a unique number. In FIG. 6A, relay node $N_2$ assigns the link with node $N_1$ as number '1' and the link with node $N_3$ as number '2'.

Next, during the operations of block 104, each node builds an internal device list that includes devices to which it is inductively coupled. In other words, each device starts building the device list that will eventually show the devices of the entire network. However, initially, each device only knows about the devices to which it is directly linked (via inductive coupling). The interface number assigned to the inductive link to a device may be used as the address of that device. An example of the operations of block 104 is shown in FIG. 6B.

In FIGS. 6B-6E, each device list will be depicted under its corresponding node (e.g., device list 114-0 for node $N_0$ is depicted under node $N_0$, device list 114-1 for node $N_1$ is depicted under node $N_1$, etc.). First, consider the device list 114-0 for node $N_0$ in FIG. 6B. Each host node, by definition, only has one inductive link. Therefore, that one inductive link may have a default assigned number. In this example, the host assigns its inductive link an identifier of '0'. However, the magnitude of this number is not critical, as the number is being used for identification purposes only. Host node $N_0$ therefore has one linked device (at node $N_1$) to include in its device list. The device list may identify the type of device at node $N_1$ (e.g., device 18 which may be a removable battery case, a wireless charging mat, a portable electronic device etc.). Device 18 is assigned an address of '0' in list 114-0, as this is the number assigned to the inductive link between $N_0$ and $N_1$ in this example.

Figure 6B:
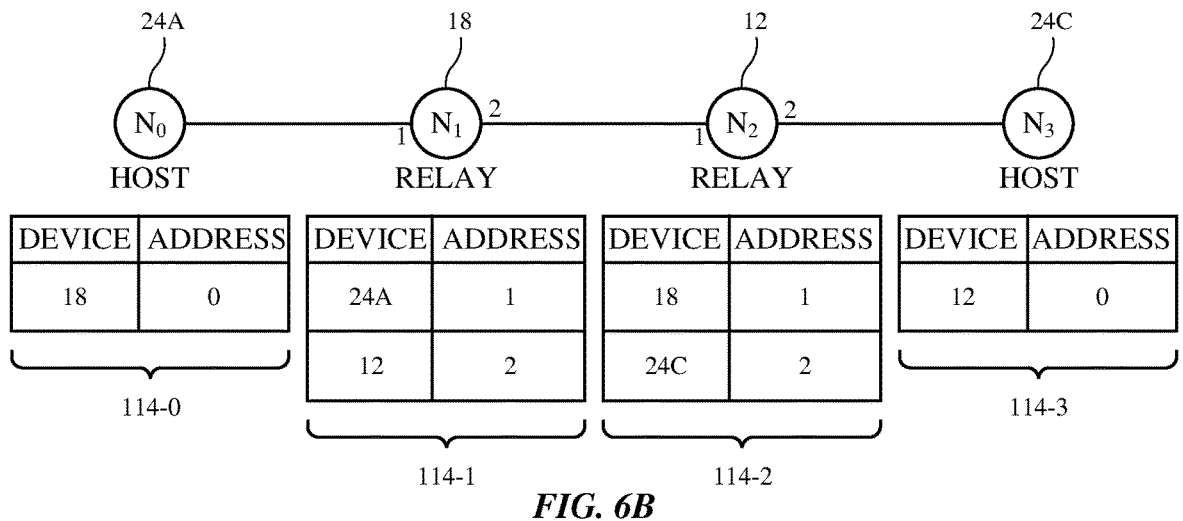

Next consider the device list 114-1 for relay node $N_1$ in FIG. 6B. As previously shown in FIG. 6A, node $N_1$ has an identifier of '1' for the inductive link with node $N_0$. Therefore, device list 114-1 assigns device 24A (e.g., the device connected using inductive link '1') an address of 1. Node $N_1$ assigned an identifier of '2' for the inductive link with node $N_2$. Therefore, device list 114-1 assigns device 12 an address of 2.

A similar process is performed for device lists 114-2 and 114-3. As previously shown in FIG. 6A, node $N_2$ has an identifier of '1' for the inductive link with node $N_1$. Therefore, device list 114-2 assigns device 18 an address of 1. Node $N_2$ assigned an identifier of '2' for the inductive link with node $N_3$. Therefore, device list 114-2 assigns device 24C an address of 2.

Finally, consider the device list 114-3 for host node $N_3$ in FIG. 6B. Again, in this example, the host assigns its inductive link an identifier of '0'. Host node $N_3$ has one linked device (at node $N_2$) to include in its device list. The device list may identify the type of device at node $N_2$ (e.g., device 12 which may be a wireless charging mat, a wireless charging puck, etc.). Device 12 is assigned an address of '0' in list 114-3, as this is the number assigned to the inductive link between $N_3$ and $N_2$ in this example.

Figure 6C:
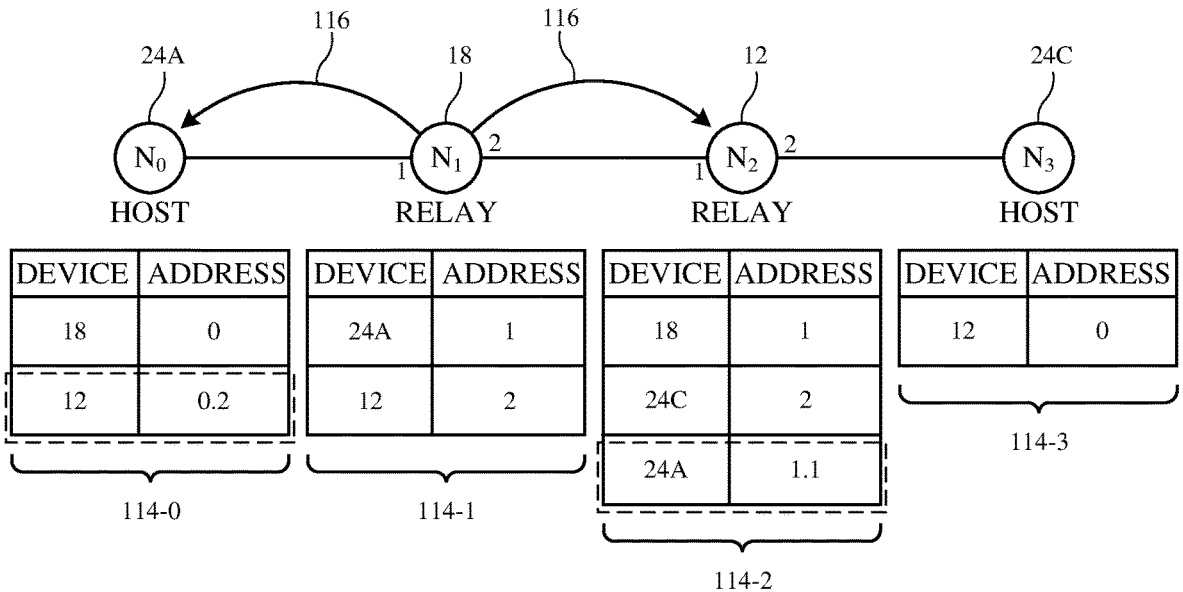
Figure 6D:
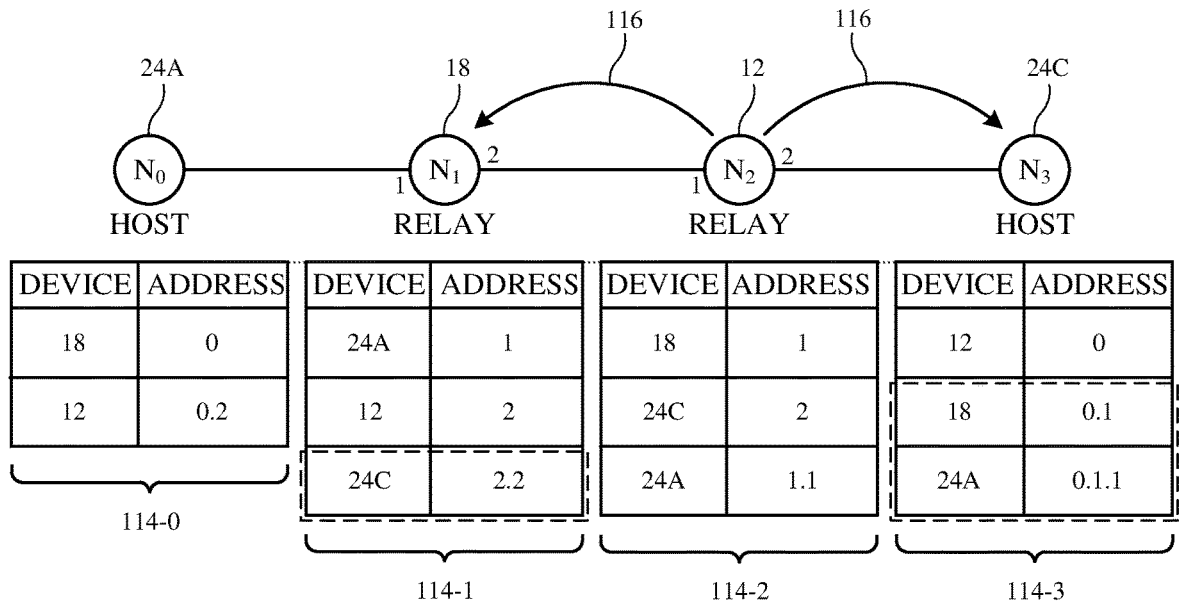

After building the initial device lists, the operations of block 106 in FIG. 5 are performed. Specifically, during the operations of block 106, each relay node reports its device list to every connected node (including both host nodes and other relay nodes). During the operations of block 108, each node adds new devices from a received device list to its internal device list. Specifically, a node that is adding a new device to its internal device list may append the interface number from which it received the device list to the address of the new device. FIGS. 6C and 6D show this process.

As shown in FIG. 6C, relay node $N_1$ may send its device list to connected nodes $N_0$ and $N_2$, as indicated by arrows 116. Host node $N_0$ receives the device list from node $N_1$ (which identifies devices 12 and 24A). Node $N_0$ is device 24A, so that device is not added to the No device list (as the internal device list does not include itself). However, the device list received from node $N_1$ also identifies device 12, which is not yet included in device list 114-0. Therefore, device 12 is added to No's device list 114-0, as is highlighted by the dashed box around this entry. The address of device 12 is copied from the received device list (e.g., '2' from device list 114-1), and a 0 is appended to the address. A '0' is appended to the address because device 24A received the device list identifying device 12 from its '0' link. Therefore, the address of device 12 is 0.2 in device list 114-0.

Relay node $N_2$ also receives the device list from node $N_1$ (which identifies devices 12 and 24A). Node $N_2$ is device 12, so that device is not added to the $N_2$ device list (as the internal device list does not include itself). However, the device list received from node $N_1$ also identifies device 24A, which is not yet included in device list 114-2. Therefore, device 24A is added to $N_2$'s device list 114-2, as is highlighted by the dashed box around this entry. The address of device 24A is copied from the received device list (e.g., '1' from device list 114-1), and a 1 is appended to the address. A '1' is appended to the address because device 12 received the device list identifying device 24A from its '1' link. Therefore, the address of device 24A is 1.1 in device list 114-2.

Next, as shown in FIG. 6D, relay node $N_2$ may send its device list to connected nodes $N_1$ and $N_3$, as indicated by arrows 116. Host node $N_3$ receives the device list from node $N_2$ (which identifies devices 18, 24C, and 24A). Node $N_0$ is device 24C, so that device is not added to the $N_3$ device list (as the internal device list does not include itself). However, the device list received from node $N_2$ also identifies devices 18 and 24A, which are not yet included in device list 114-3. Therefore, devices 18 and 24A are added to $N_3$'s device list 114-3, as is highlighted by the dashed box in FIG. 6D. The address of device 18 is copied from the received device list (e.g., '1' from device list 114-2), and a 0 is appended to the address. A '0' is appended to the address because device 24C received the device list identifying device 18 from its '0' link. Therefore, the address of device 18 is 0.1 in device list 114-3. The address of device 24A is copied from the received device list (e.g., '1.1' from device list 114-2), and a 0 is appended to the address. A '0' is appended to the address because device 24C received the device list identifying device 24A from its '0' link. Therefore, the address of device 24A is 0.1.1 in device list 114-3.

Relay node $N_1$ also receives the device list from node $N_2$ (which identifies devices 18, 24C, and 24A). Node $N_1$ is device 18, so that device is not added to the $N_1$ device list (as the internal device list does not include itself). Device list 114-1 for node $N_1$ already includes device 24A. Therefore, even though the received device list from node $N_2$ includes device 24A, device 24A is not added to the device list 114-1 (as such an entry would be duplicative). The device list received from node $N_2$ by node $N_1$ also identifies device 24C, which is not yet included in device list 114-1. Therefore, device 24C is added to $N_1$'s device list 114-1, as is highlighted by the dashed box in FIG. 6D. The address of device 24C is copied from the received device list (e.g., '2' from device list 114-2), and a 2 is appended to the address. A '2' is appended to the address because device 18 received the device list identifying device 24C from its '2' link. Therefore, the address of device 24C is 2.2 in device list 114-1.

Figure 6E:
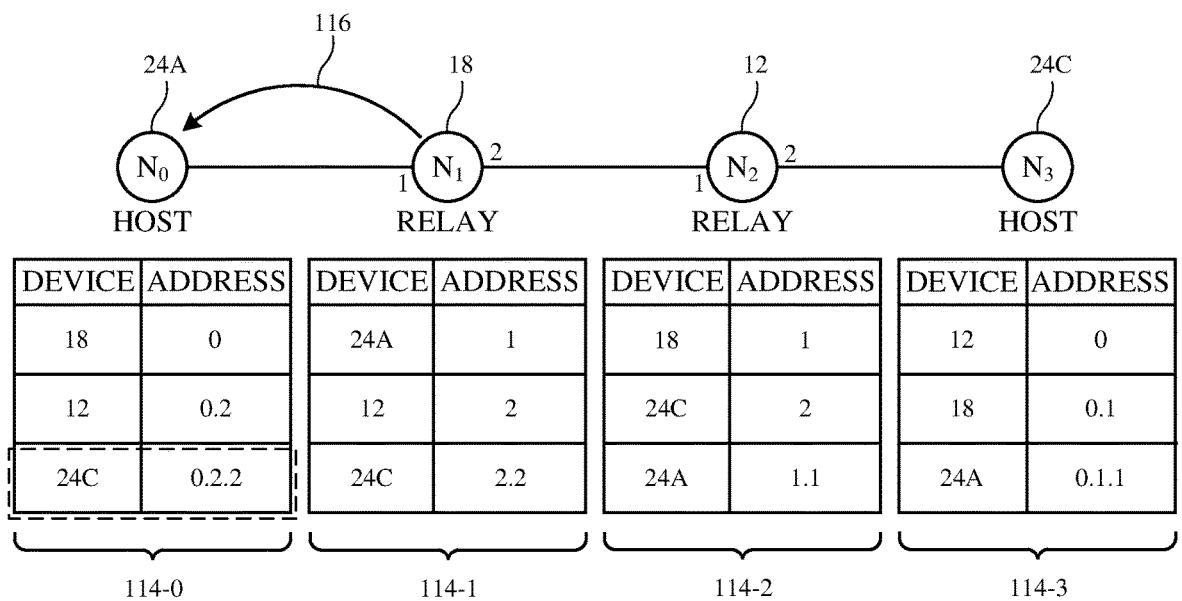

Next, during the operations of block 110 in FIG. 5, relay nodes that have updated their internal device lists may send the updated device list to every connected node (except for the node it received the device list from). This type of example is shown in FIG. 6E. First consider relay node $N_2$. Relay node $N_2$ has updated its device list to include device 24A. However, the device list including device 24A has already been sent to node $N_3$, therefore the relay node does not need to send the device list to node $N_3$ again. Node $N_2$ received the device list with newly added device 24A from node $N_1$, therefore node $N_2$ does not need to send the device list back to node $N_1$. Therefore, node $N_2$ does not need to redistribute its device list to any connected nodes.

Node $N_1$, meanwhile, has updated its device list to include device 24C. Node $N_1$ received the device list with newly added device 24C from node $N_2$, therefore node $N_1$ does not need to send the device list back to node $N_2$. However, node $N_1$ has not sent its device list to node $N_0$ since adding device 24C. Therefore, as shown by arrow 116 in FIG. 6E, node $N_1$ may send its updated device list to node $N_0$. The flowchart of FIG. 5 loops back to the operations of block 108 in response to the device list being freshly distributed.

Host node $N_0$ receives the new device list from node $N_1$ (which identifies devices 24A, 12, and 24C). Node $N_0$ is device 24A, so that device is not added to the $N_0$ device list (as the internal device list does not include itself). Device list 114-0 for node $N_0$ already includes device 12. Therefore, even though the received device list from node $N_1$ includes device 12, device 12 is not added to the device list 114-0 (as such an entry would be duplicative). The device list received from node $N_1$ by node $N_0$ also identifies device 24C, which is not yet included in device list 114-0. Therefore, device 24C is added to No's device list 114-0, as is highlighted by the dashed box in FIG. 6E. The address of device 24C is copied from the received device list (e.g., '2.2' from device list 114-1), and a 0 is appended to the address. A '0' is appended to the address because device 24A received the device list identifying device 24C from its '0' link. Therefore, the address of device 24C is 0.2.2 in device list 114-0.

The operations of blocks 108 and 110 in FIG. 5 may be repeated until the network is fully discovered. The network may be fully discovered when step 108 in FIG. 5 does not prompt an updated list distribution in step 110. For example, in FIG. 6E, relay node $N_1$ sends its device list to host node $N_0$. Host node $N_0$ does not distribute the device list again, and there are no other relay node updates to distribute. Therefore, the network discovery process is complete.

As shown in FIG. 6E, at the end of the network discovery process, each device has a corresponding device list that includes all of the other devices in the network. The device list may identify the type of device (e.g., a power transmitting device, a power transmitting and receiving device, a power receiving device, etc.). However, the device type included in the device lists may be agnostic to the specific user of the device. In one example, the device type may identify a brand, model, and/or type of each device (e.g., a cellular telephone, wrist watch, tablet computer, etc.).

The addresses included in each device list are temporary addresses based on the current topology of the network. If the topology of the network changes, the addresses will also change. The addresses may therefore sometimes be referred to as locally assigned addresses or simply local addresses. Specifically, each address in a given device's device list may identify an inductive coupling path from the given device to each other device in the list. The address provides an inductive coupling road map from the given device to each device in the list, with each digit identifying a respective inductive coupling link. For example, consider device list 114-0 for device 24A (node No). The device list for device 24A includes device 18 at address 0. Address 0 indicates that device 18 is at device 24A's '0' inductive coupling link. Next, the device list for device 24A includes device 12 at address 0.2. To reach device 12, you follow the inductive path indicated by the first digit (0) to device 18. Then, the next digit of the address ('2') identifies an inductive link 2 that leads to device 12. Once there are no more remaining digits in the address, the destination address has been reached.

As yet another example, device list 114-0 includes device 24C at address 0.2.2. To reach device 24C from device 24A, you follow the inductive path indicated by the first digit (0) to device 18. Then, the next digit of the address ('2') identifies an inductive link 2 associated with device 12. Following the inductive path '2' from device 18 leads to device 12. The next (and final) digit of the address is '2'. This identifies an inductive link 2 associated with device 24C. Following the inductive path 2 from device 12 leads to target device 24C.

Each digit in the address therefore represents an inductive link between devices within the network. By following the inductive links identified in the address, a packet can be transmitted to a target device. As another example, consider device list 114-3 for device 24C. Device 24A has an address of 0.1.1 in list 114-3. To reach device 24A, a path is followed along device 24C's inductive link 0 (the first address digit) to reach a first intervening device (device 12). The first intervening device follows its inductive link 1 (the second address digit) to reach a second intervening device (device 18). The second intervening device follows its inductive link 1 (the third address digit) to reach the target device (device 24A). In this way, any device within the network can communicate with any other device within the network using the destination addresses. Each destination address provides a path of inductive links (e.g., an inductive coupling path) to navigate the network topology and reach the desired target device. This addressing scheme has the benefit of each address providing instructions for how to reach a target device, not just providing the identity of a target device.

Figure 7:
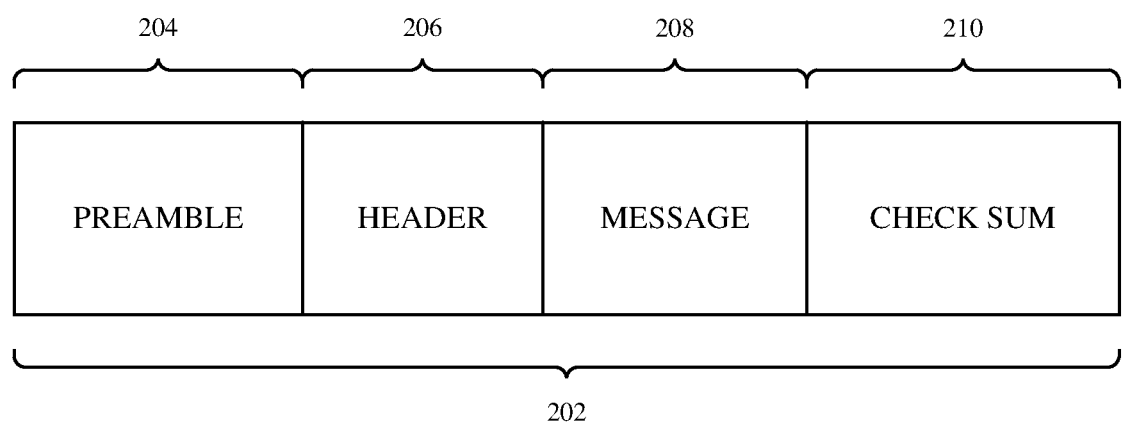
FIG. 7 is a diagram of an illustrative packet that may be used for communication in a wireless power system in accordance with an embodiment.

Various packet structures may be used to enable the addressing scheme described in connection with FIGS. 5 and 6A-6E. FIG. 7 is a diagram of an illustrative packet 202. In general, packet 202 may have a preamble 204 (e.g., one or more preamble bytes), a header 206 (e.g., one or more header bytes), a message 208 (e.g., one or more message bytes), and a checksum 210 (e.g., one or more checksum bytes). The preamble 204 may include a sequence of bits that enables the data-packet-receiving-device to accurately detect the start bit of the header. The header 206 may indicate the type of data packet that is being transmitted. Header information may include, for example, a stream number identifying a stream number to which the data packet belongs, a destination address for the packet, a flag indicating whether or not a multi-transfer scenario is present, etc. The message 208 (sometimes referred to as payload) includes the data that is desired to be transmitted. The payload may be data, an instruction, a request, etc. Checksum 210 allows for verification that the entire packet was transmitted successfully. The device receiving the packet may calculate a checksum value for the packet and compare the calculated checksum value to a target checksum value received in the checksum byte. If the calculated checksum value and the target checksum value match, the packet is interpreted as being transmitted successfully. If the calculated checksum value and the target checksum value do not match, the packet transmission is interpreted as including an error.

FIG. 8 is a diagram of an illustrative packet structure for a device list (e.g., device lists 114-0, 114-1, 114-2, or 114-3 in FIGS. 6B-6E). Specifically, the payload including the device list is shown in FIG. 8, but it should be understood that the other packet components of FIG. 7 may also be included in a packet with a device list. As shown, the device list may be represented by a plurality of bytes. In FIG. 8, each byte is depicted as having 8 bits. This example is merely illustrative, and each byte may have any desired number of bits. The first byte ($B_0$) may identify a first device type (e.g., the device 0 device type). The second byte ($B_1$) may identify a device address associated with the first device (e.g., the device 0 address). The third byte ($B_2$) may identify a second device type (e.g., the device 1 device type). The fourth byte ($B_3$) may identify a device address associated with the second device (e.g., the device 1 address). This pattern may continue, with pairs of bytes identifying a device type and address until all of the devices in the list are identified.

Each time a device list is transmitted (as in FIGS. 6B-6E, for example), the device list may be transmitted as a packet having the arrangement shown in FIG. 8. The packet payload (identifying the devices, shown in FIG. 8) may have twice as many bytes as identified devices (since there are two associated bytes with each device). This example is merely illustrative, and other packet structures may be used to convey device lists between devices if desired.

FIG. 9 is a diagram of an illustrative header that may be used for packets transmitted in system 8. It should be understood that the header in FIG. 9 may be part of a packet including the other packet components of FIG. 7. As shown in FIG. 9, a first byte may include three bits dedicated to identifying a stream number associated with the packet. The first three bits of the stream header (bits $b_0$, $b_1$, and $b_2$) are used to identify a stream number for the data packet. In this example, the three identifying bits allow for eight active streams. In other words, a stream number of 0, 1, 2, 3, 4, 5, 6, or 7 will be identified using bits $b_0$-$b_2$. This example is merely illustrative. In general, any desired number of bits (e.g., one, two, three, four, more than four, etc.) may be used to identify a stream number.

In some embodiments, 1 bit is used to identify a stream number. In some embodiments, 2 bits are used to identify a stream number. In some embodiments, 3 bits are used to identify a stream number. In some embodiments, 4 bits are used to identify a stream number. In some embodiments, 5 bits are used to identify a stream number. In some embodiments, 6 bits are used to identify a stream number. In some embodiments, 7 bits are used to identify a stream number. It is noted that as long as there are sufficient bits, any combination of stream identification bits and header length can be implemented. For example, in an 8 bit header, anywhere between 1 to 8 bits can be reserved for stream identification. In a 16 bit header, anywhere between 1 to 16 bits can be reserved for stream identification. In a 24 bit header, anywhere between 1 to 24 bits can be reserved for stream identification. In a 32 bit header, anywhere between 1 to 32 bits can be reserved for stream identification. In a 48 bit header, anywhere between 1 to 48 bits can be reserved for stream identification. In a 64 bit header, anywhere between 1 to 64 bits can be reserved for stream identification.

As shown in FIG. 9, the second byte ($B_1$) of the header may be used to identify a source address for the packet (e.g., where the packet originated). The third byte ($B_2$) may be used to identify a destination address for the packet (e.g., an intended target device for the packet).

Bits $b_3$-$b_5$ of the first byte of the header may be reserved. Bit $b_6$ of $B_0$ may be used to indicate a broadcast mode. In the broadcast mode, a given payload is intended to be distributed (broadcast) to every device in the network. If the broadcast bit is a positive indicator for the broadcast mode (e.g., a '1' bit flagging the broadcast mode), the destination address in the header may be ignored or considered invalid. Instead, a device that receives a packet with the broadcast mode flagged will transmit that packet to all other devices to which it is inductively coupled. In this way, it is ensured that the packet is distributed throughout the network without having to send individual packets with targeted destination addresses to each device. To summarize, if bit $b_6$ is a negative indicator for the broadcast mode (e.g., '0' may indicate the absence of the broadcast mode), the destination address in the header may be used to inform the transmission of the packet. If bit $b_6$ is a positive indicator for the broadcast mode (e.g., '1' may indicate the presence of the broadcast mode), the destination address in the header may be ignored.

Bit $b_7$ of $B_1$ may be used to indicate a multi-device mode. In the multi-device mode, there may be at least three electronic devices present in the communication network. If there are only two devices present, packets may only be exchanged between those two devices. In this scenario, there is no need for using a destination address as only one destination address is available. Therefore, if there are only two devices in the network the multi-device mode may be negative (e.g., '0') and the destination address field may be empty or invalid. If three devices are present, additional header information may be used to identify the destination of each packet. If the mode bit is a positive indicator for the multi-device mode (e.g., a '1' bit), the destination address may be used to inform possible further transmission of the packet. To summarize, bit $b_7$ may be a negative indicator for the multi-device mode (e.g., '0') when only two devices are present in the network. Bit $b_7$ may be a positive indicator for the multi-device mode (e.g., '1') when more than two devices are present in the network. The destination address may be used when the multi-device mode is flagged and may be invalid when the multi-device mode is not flagged.

FIG. 10 is a diagram of an illustrative address byte that may be used for the addresses in FIG. 8 and/or FIG. 9. As shown in FIG. 10, an address (e.g., a source address or a destination address) may be represented by four branch numbers, with each branch number including two respective bits. Each branch number represents an inductive coupling path within the network. Each branch number may be a digit of the destination address. For example, the address 0.2.2 in list 114-0 in FIG. 6E has three branch numbers: 0, 2, and 2.

The example of the address having one byte in FIG. 10 is merely illustrative. One or more bytes may be used to represent an address. The structure of the address byte(s) may affect the type of network topology supported by the address byte. The number of branch numbers included in the address byte is equal to the supported network depth of the communications network. For example, in FIG. 10 there is space for four branch numbers. Therefore, there may be a maximum of four inductive links between two nodes in the network. Additional branch numbers may be included in the address byte(s) to support larger network depths.

The number of bits included in each branch number may affect the branching limit of the communications network. Including more bits in each branch number will allow for a given device in the network to be coupled to more devices.

The example in FIG. 10 of the address byte(s) having four branch numbers is merely illustrative. The address byte(s) may have two branch numbers, three branch numbers, five branch numbers, six branch numbers, more than six branch numbers, more than eight branch numbers, more than ten branch numbers, more than fifty branch numbers, etc. In some embodiments, each branch number may include one bit. In some embodiments, each branch number may include two bits. In some embodiments, each branch number may include three bits. In some embodiments, each branch number may include four bits. In some embodiments, each branch number may include more than four bits. In some embodiments, each branch number may include six bits. It is noted that as long as there are sufficient bits, any combination of branch numbers and bits per branch number can be implemented. For example, in an address with two branch numbers, anywhere between 1 to 6 bits may be used in each branch number. In an address with three branch numbers, anywhere between 1 to 6 bits may be used in each branch number. In an address with four branch numbers, anywhere between 1 to 6 bits may be used in each branch number. In an address with five branch numbers, anywhere between 1 to 6 bits may be used in each branch number. In an address with six branch numbers, anywhere between 1 to 6 bits may be used in each branch number.

Figure 11:
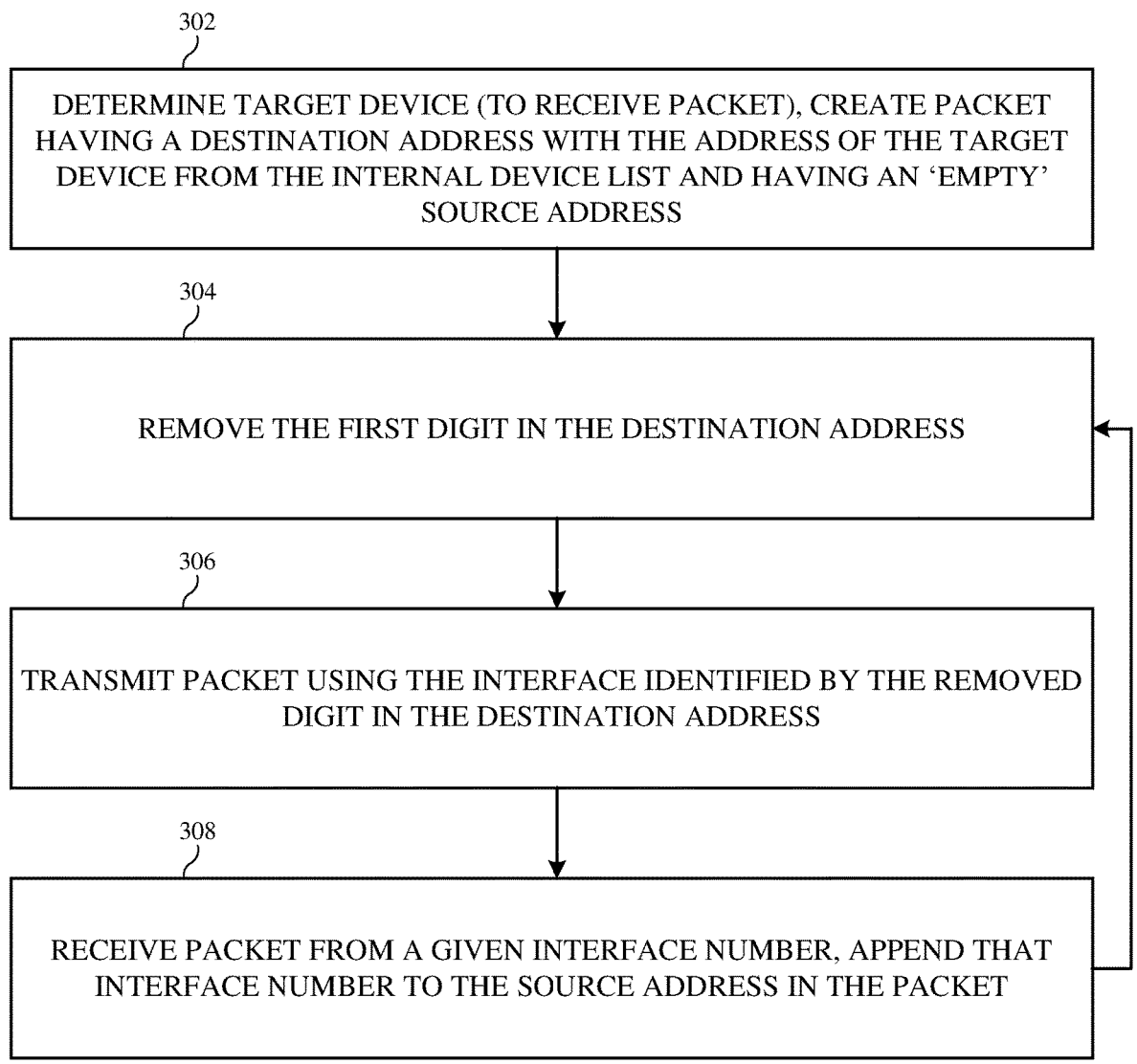
FIG. 11 is a flowchart showing illustrative operations involved in transmitting a packet between devices in the wireless power system in accordance with an embodiment.
Figure 12A:
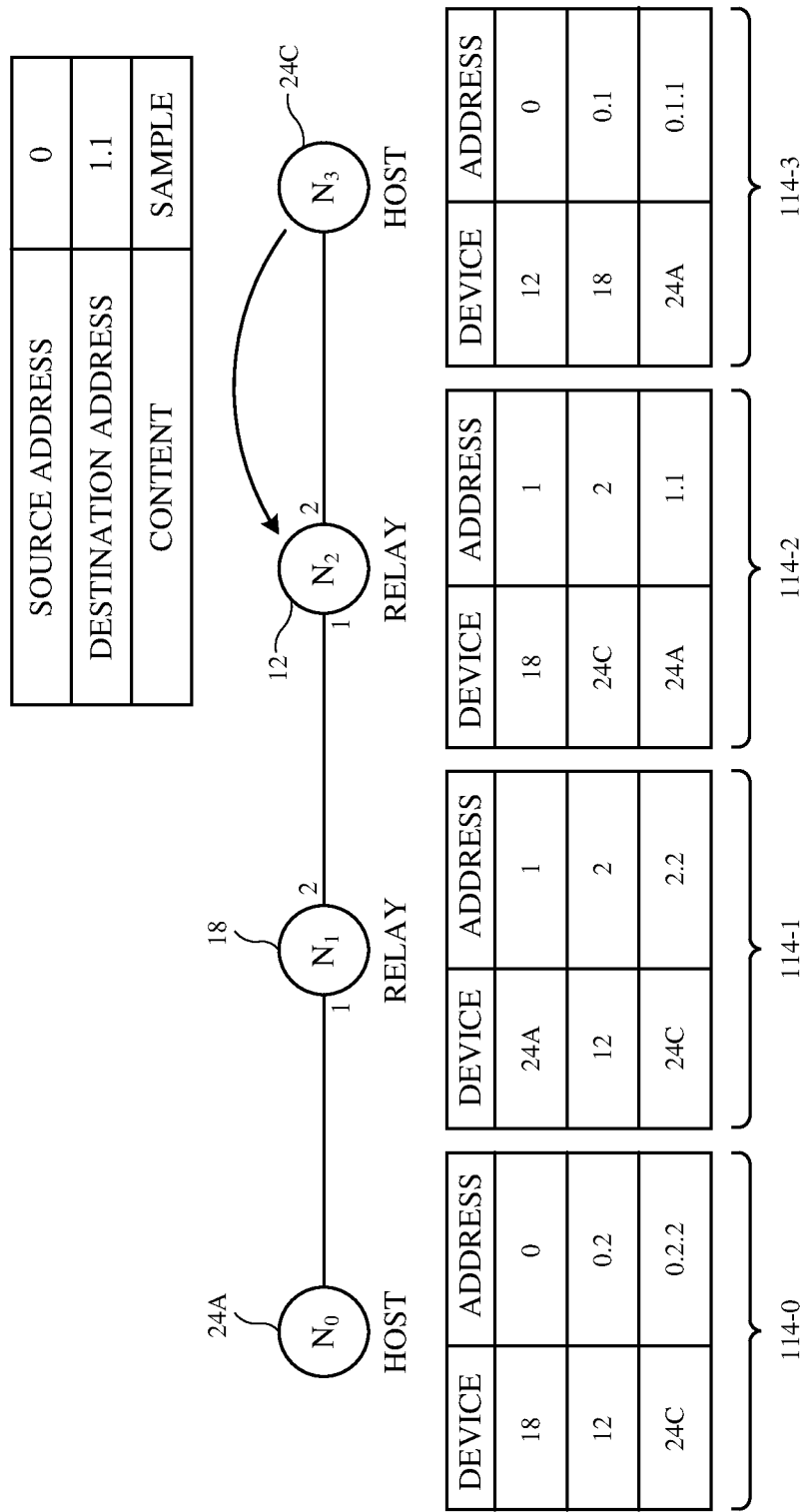
FIGS. 12A-12C are diagrams showing various steps of the packet transfer process of FIG. 11 in accordance with an embodiment.
Figure 12B:
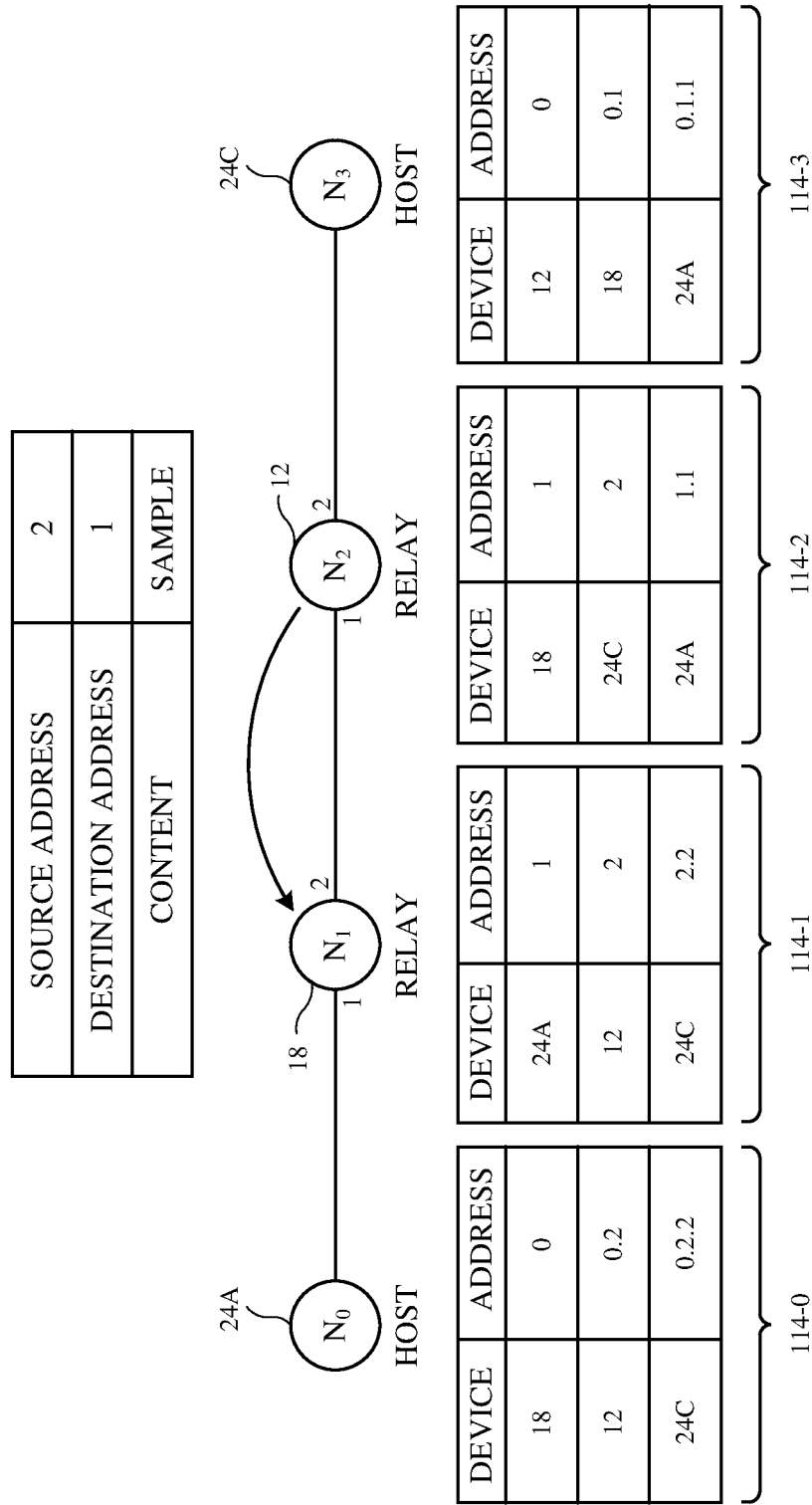
Figure 12C:
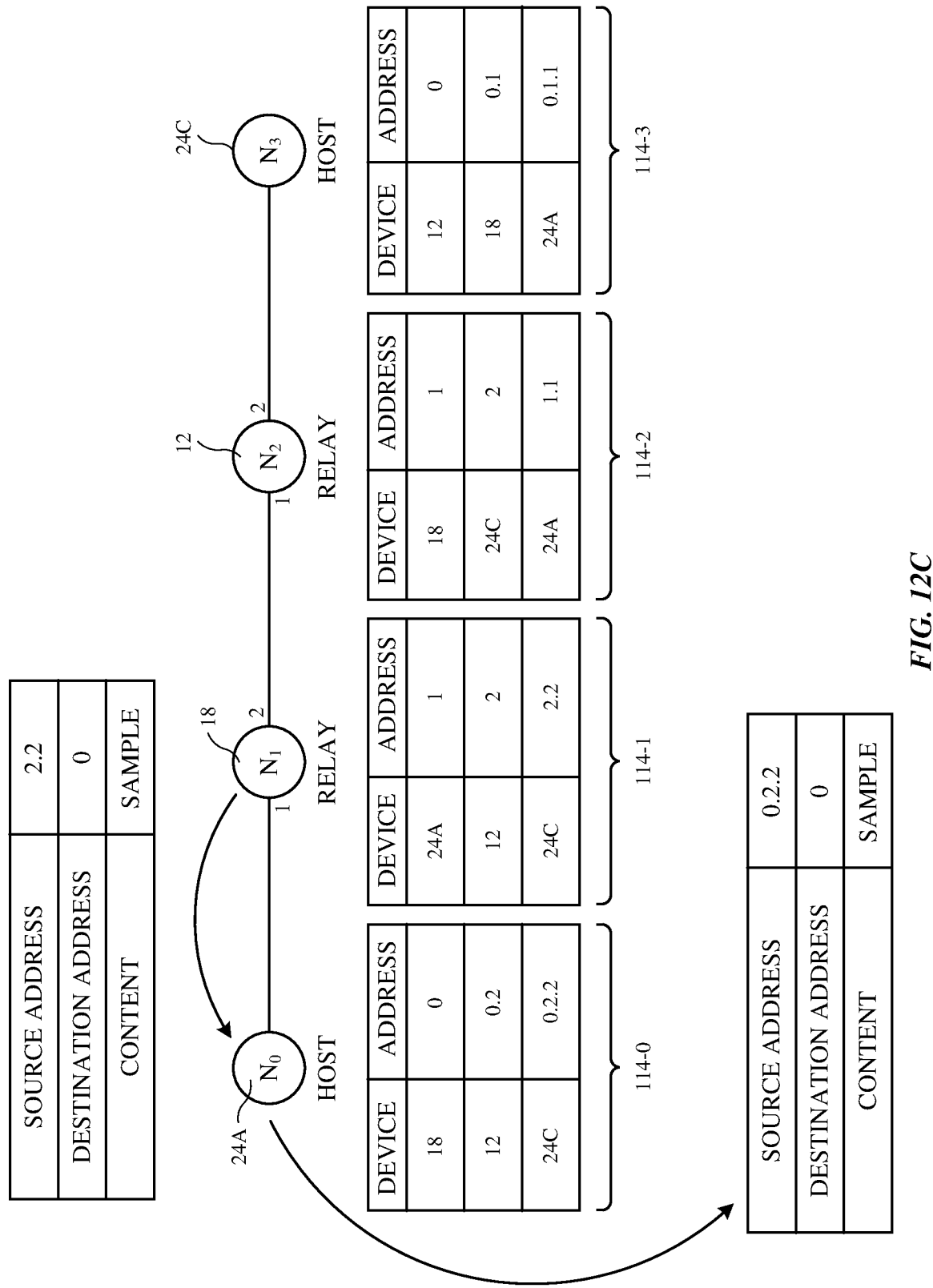

The addressing scheme shown and described in connection with FIGS. 5-10 enables a device in the network to transmit a packet to any another device in the network (even if they are not inductively coupled). FIG. 11 is a flow chart of illustrative operations involved in transferring a packet from a given device to an additional device in the network that is not inductively coupled to the given device. FIGS. 12A-12C are diagrams showing various steps of the packet transmission process.

During the operations of block 302, a device in the network (e.g., device 24C in FIG. 12A) identifies a target device (e.g., the end destination) for a packet (while transmitting or receiving power using a coil). In the example of FIG. 12A, device 24C intends to transmit a packet to device 24A. The packet is created using the address of the target device from the device list of the originating device. In the example of FIG. 12A, the packet may use address 0.1.1 (associated with target device 24A) as the destination address. The source address may be '0' or 'empty' (e.g., there is no other source for the packet since device 24C is creating the packet).

During the operations of block 304, the first digit of the destination address may be removed. As shown in FIG. 12A, '0' is removed from 0.1.1, resulting in 1.1 being used as the destination address. Next, during the operations of block 306, the packet is transmitted using the interface (link) identified by the removed digit from the destination address ('0' in this case). In other words, device 24C transmits the packet using inductive link '0' to device 12.

During the operations of block 308, the device receiving the packet may append the interface number from which the packet is received to the source address in the packet (e.g., as the new first digit in the source address). For example, device 12 receives the packet using inductive link 2 in FIG. 12A. Therefore, device 12 may append '2' to the source address of the packet. Then, the operations may return to block 304 and the operations of block 304-308 may be repeated. The operations of blocks 302, 304, 306, and 308 may all be performed while wireless power is transmitted between devices in the network.

As shown in FIG. 12B, device 12 removes the first digit from the received destination address (1.1), with a resulting destination address of 1. Device 12 then transmits the packet using the interface identified by the removed digit (1). In other words, device 12 transmits the packet over inductive link 1 to device 18, as shown in FIG. 12B. Device 18 receives the packet using inductive link 2 in FIG. 12B. Therefore, device 18 may append '2' to the source address as the new first digit of the packet (with a resulting source address of 2.2). Then, the operations may return to block 304 and the operations of block 304-308 may be repeated.

As shown in FIG. 12C, device 18 removes the first digit from the received destination address (1), with a resulting destination address of 0. Device 18 then transmits the packet using the interface identified by the removed digit (1). In other words, device 18 transmits the packet over inductive link 1 to device 24A, as shown in FIG. 12C. Device 24A receives the packet using inductive link 0 in FIG. 12C. Therefore, device 24A may append '0' to be the new first digit in the source address of the packet (with a resulting source address of 0.2.2). The destination address of the packet is 0, indicating that no further transfer of the packet is required and the packet is intended for device 24A.

When the target device eventually receives the packet and appends the inductive link number to the source address, the resulting source address indicates the device that originated the transmission of the packet. For example, in FIG. 12C, the source address of 0.2.2 is the same as the address of device 24C in device 24A's device list. Thus, device 24A knows that the packet originated from device 24C.

In this way, packets may be transferred between any devices in the network (e.g., even devices that are not inductively coupled). In-band communication (e.g., using FSK modulation or ASK modulation) may be used for each transmission of the packet across an inductive link. The destination address serves as a road map to guide transmission of the packet to the final destination. The source address is recorded as the packet passes through the network, such that the receiving device receives a source address that identifies which node sent the packet.

In the example of FIGS. 11 and 12A-12C, the device removes the first digit in the destination address and then subsequently transmits the packet using the inductive link identified by the removed digit. It should be understood that this scheme is merely illustrative. In another possible embodiment, the device may transmit the packet based on the first digit in the destination address. Upon receiving a packet, a device then removes the first digit in the destination address. In other words, the digit may be removed from the destination address on either the transmitter or receiver side of the transmission. Similarly, a digit may be appended to the source address at either the transmitter or receiver side of the transmission.

There are numerous types of data packets that may be transmitted during operation of one or more data streams using the wireless power system. Auxiliary data control (ADC) packets may be used to open and close (activate and deactivate) data streams. Auxiliary data transport (ADT) packets may be used to transmit data using an active data stream. Data stream response (DSR) packets may allow acknowledgments to be transmitted upon successful receipt of data. All of these types of packets may include a header identifying a corresponding stream number as well as a destination address for the packet (e.g., a header as shown in FIG. 9). As the packets are enabled to function in a wireless network with three or more devices (e.g., a network where multiple transfers are possible), the packets may be referred to as multi-device or multi-transfer packets. The abbreviations M-ADT, M-ADC, and M-DSR may be used for ADT, ADC, and DSR packets that are transferred multiple times within the network.

Figure 13:
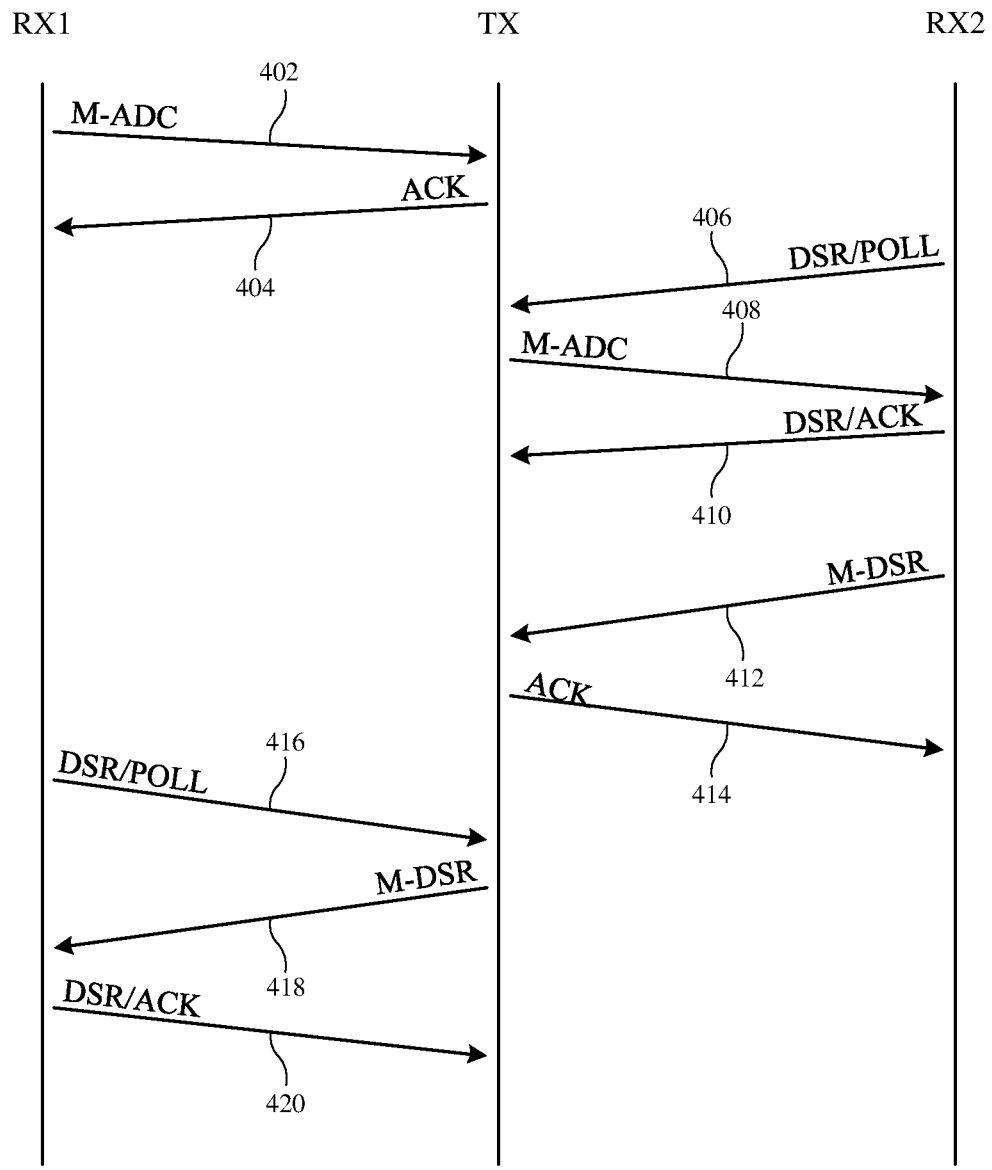
FIG. 13 is a diagram showing illustrative packet exchanges that may be used for a first device to open a data stream with a second device to which it is not inductively coupled in accordance with an embodiment.

FIG. 13 is a diagram of illustrative operations that may be used to open a data stream between two devices in the network that are not inductively coupled. As shown in FIG. 13, there may be a first wireless power receiving device RX1, a wireless power transmitting device TX, and a second wireless power receiving device RX2 in the system. Devices RX1 and TX are inductively coupled. Devices RX2 and TX are inductively coupled. Devices RX1 and RX2 are not inductively coupled. However, RX1 may initiate the opening of a data stream with RX2.

As shown in FIG. 13, RX1 may transmit an auxiliary data control packet (M-ADC) packet 402 to the transmitting device TX. The M-ADC packet may identify RX2 as the destination address for the packet. The M-ADC packet may include a payload with a request to open a data stream with RX2. In response to receiving the M-ADC packet, transmitting device TX may reply to RX1 with an acknowledgement packet (ACK) 404. Next, TX may receive a DSR/POLL packet 406 from RX2 (indicating that RX2 is available to receive packets). In response, TX transmits the M-ADC packet 408 to RX2. The payload of M-ADC packet 408 may be unchanged between the transmission between RX1 and TX and the transmission between TX and RX2. In response to receiving the M-ADC packet, RX2 may respond to TX with a DSR/ACK packet 410 acknowledging receipt of the M-ADC packet.

Next, RX2 may send a M-DSR 412 packet to TX. The M-DSR packet may identify RX1 as the destination address for the packet. The M-DSR packet may include a payload with a confirmation of opening the data stream with RX1. In response to receiving the M-DSR packet, transmitting device TX may reply to RX2 with an acknowledgement packet (ACK) 414. Next, TX may receive a DSR/POLL packet 416 from RX1 (indicating that RX1 is available to receive packets). In response, TX transmits the M-DSR packet 418 to RX1. The payload of M-DSR packet 418 may be unchanged between the transmission between RX2 and TX and the transmission between TX and RX1. In response to receiving the M-DSR packet, RX1 may respond to TX with a DSR/ACK packet 420 acknowledging receipt of the M-DSR packet.

Using this type of communication scheme, data streams may be opened and closed between devices in the network that are not inductively coupled. It should be noted that the acknowledgement packets in FIG. 13 (e.g., packets 404, 410, 414, and 420) may not be transferred between multiple inductive links. These packets may therefore may have an empty or invalid destination address and a mode field (see FIG. 9) that indicates a transfer over a single inductive link. Additionally, if desired, the transmitting device TX may optionally respond to RX2 after receiving DSR/ACK 410. The transmitting device TX may also optionally respond to RX1 after receiving DSR/ACK 420.

Figure 14:
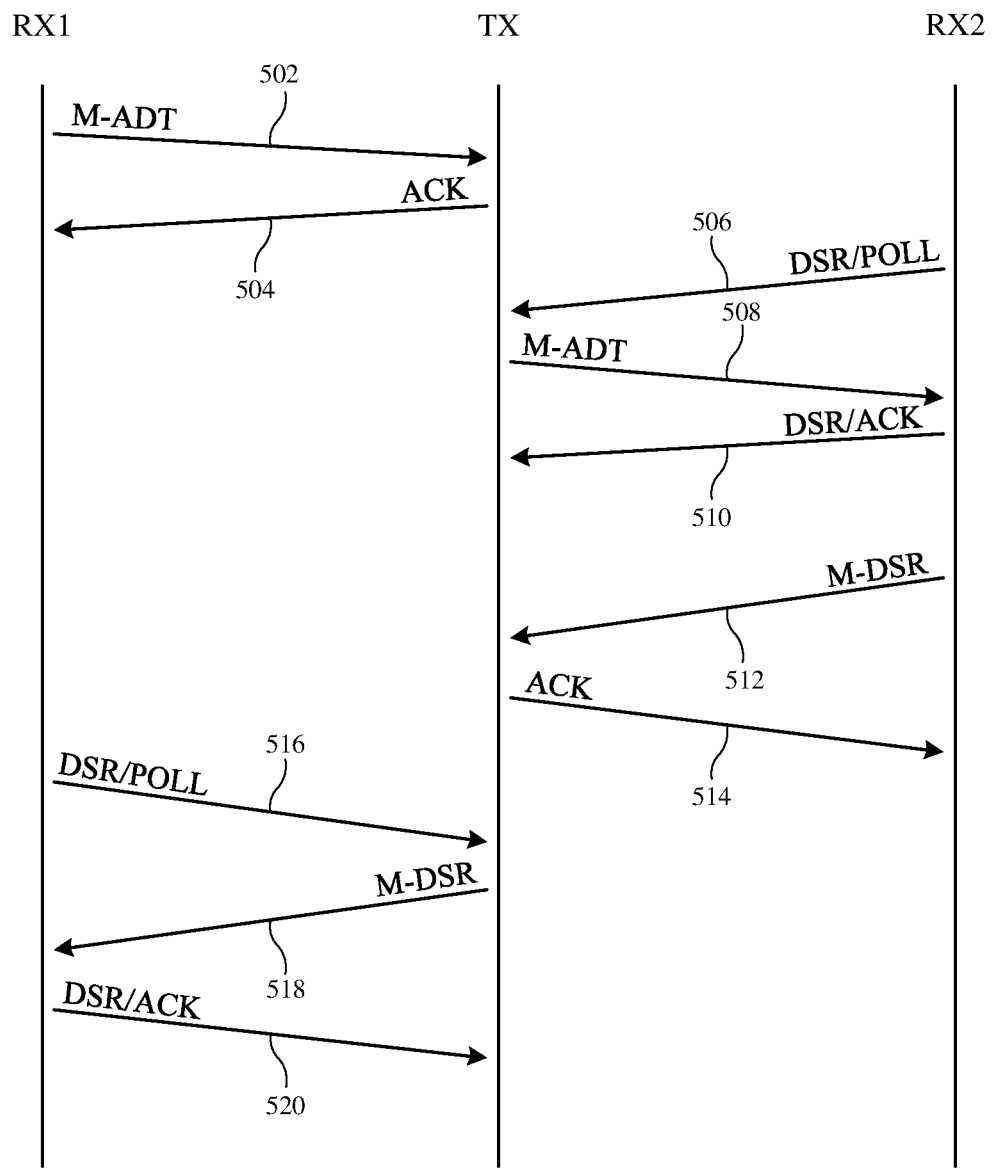
FIG. 14 is a diagram showing illustrative packet exchanges that may be used for a first device to transmit data to a second device to which it is not inductively coupled in accordance with an embodiment.

FIG. 14 is a diagram of illustrative operations that may be used to transfer data in an active data stream between two devices in the network that are not inductively coupled. As shown in FIG. 14, there may be a first wireless power receiving device RX1, a wireless power transmitting device TX, and a second wireless power receiving device RX2 in the system. Devices RX1 and TX are inductively coupled. Devices RX2 and TX are inductively coupled. Devices RX1 and RX2 are not inductively coupled. However, RX1 may send data to RX2 over an active data stream.

As shown in FIG. 14, RX1 may transmit an auxiliary data transfer packet (M-ADT) packet 502 to the transmitting device TX. The M-ADT packet may identify RX2 as the destination address for the packet. The M-ADT packet may include a payload with data for RX2 and may identify a stream number to which the data corresponds. In response to receiving the M-ADT packet, transmitting device TX may reply to RX1 with an acknowledgement packet (ACK) 504. Next, TX may receive a DSR/POLL packet 506 from RX2 (indicating that RX2 is available to receive packets). In response, TX transmits the M-ADT packet 508 to RX2. The payload of M-ADT packet 508 may be unchanged between the transmission between RX1 and TX and the transmission between TX and RX2. In response to receiving the M-ADT packet, RX2 may respond to TX with a DSR/ACK packet 510 acknowledging receipt of the M-ADT packet.

Next, RX2 may send a M-DSR 512 packet to TX. The M-DSR packet may identify RX1 as the destination address for the packet. The M-DSR packet may include an acknowledgement of the received data from RX1 and/or additional data intended for RX1. In response to receiving the M-DSR packet, transmitting device TX may reply to RX2 with an acknowledgement packet (ACK) 514. Next, TX may receive a DSR/POLL packet 516 from RX1 (indicating that RX1 is available to receive packets). In response, TX transmits the M-DSR packet 518 to RX1. The payload of M-DSR packet 518 may be unchanged between the transmission between RX2 and TX and the transmission between TX and RX1. In response to receiving the M-DSR packet, RX1 may respond to TX with a DSR/ACK packet 520 acknowledging receipt of the M-DSR packet.

Using this type of communication scheme, data may be transferred between devices in the network that are not inductively coupled. It should be noted that the acknowledgement packets in FIG. 14 (e.g., packets 404, 410, 414, and 420) may not be transferred between multiple inductive links. These packets may therefore may have an empty or invalid destination address and a mode field (see FIG. 9) that indicates a transfer over a single inductive link. Additionally, if desired, the transmitting device TX may optionally respond to RX2 after receiving DSR/ACK 510. The transmitting device TX may also optionally respond to RX1 after receiving DSR/ACK 520.

In FIGS. 13 and 14, in-band communication (e.g., using FSK modulation or ASK modulation) may be used for each depicted packet transmission.

If desired, the devices in system 8 may communicate using separate antennas (e.g., antennas coupled to wireless transceiver circuitry 40, 46, and 80 in FIG. 1) instead of the coils. For example, Bluetooth communication may be used for wireless communication between the devices. In one illustrative example, in-band communication (e.g., communication using coils 36, 48, and 90) may be relied upon for the network discovery process and other initial communications. After network discovery is complete, in-band communication may be used for devices within the system to exchange Bluetooth credentials, after which those devices may optionally switch to Bluetooth communication instead of in-band communication if desired.

The foregoing is merely illustrative and various modifications can be made to the described embodiments. The foregoing embodiments may be implemented individually or in any combination.

What is claimed is:

1. An electronic device that is operable in a wireless charging system with at least first and second additional electronic devices, the electronic device comprising:
   wireless power circuitry including at least one coil;
   in-band communications circuitry configured to use the at least one coil to communicate with the first and second additional electronic devices; and
   control circuitry that is configured to:
      receive a packet from the first additional electronic device using the in-band communications circuitry, wherein the packet has a payload;
      using information from the packet, determine whether to transmit the payload to the second additional electronic device using the in-band communications circuitry; and
      in accordance with determining to transmit the payload to the second additional electronic device using the in-band communications circuitry, transmit the payload to the second additional electronic device using the in-band communications circuitry.

2. The electronic device of claim 1, wherein the packet from the first additional electronic device includes a source address and wherein the control circuitry is configured to:
add a digit to the source address to form a modified source address; and
using the in-band communications circuitry, transmit an additional packet to the second additional electronic device that includes the payload and the modified source address.

3. The electronic device of claim 2, wherein the digit added to the source address corresponds to an inductive link to the first additional electronic device.

4. The electronic device of claim 2, wherein the packet from the first additional electronic device includes a destination address and wherein the control circuitry is configured to:
remove a digit from the destination address to form a modified destination address, wherein the additional packet includes the modified destination address.

5. The electronic device of claim 4, wherein the digit removed from the destination address corresponds to an inductive link to the second additional electronic device.

6. The electronic device of claim 1, wherein the packet from the first additional electronic device includes a header in addition to the payload and wherein the header includes a source address and a destination address.

7. The electronic device of claim 6, wherein the header includes a stream number that identifies a corresponding data stream associated with the packet.

8. The electronic device of claim 7, wherein the header includes a mode field that indicates whether the packet needs be transmitted multiple times to reach a target device.

9. The electronic device of claim 8, wherein the header includes a broadcast field that indicates whether the destination address is valid.

10. An electronic device that is operable in a wireless charging system with at least first and second additional electronic devices, wherein the electronic device is inductively coupled to the first additional electronic device without being inductively coupled to the second additional electronic device, wherein the first additional electronic device is inductively coupled to the second additional electronic device, and wherein the electronic device comprises:
wireless power circuitry including at least one coil;
in-band communications circuitry configured to use the at least one coil to communicate with the first additional electronic device; and
control circuitry that is configured to:
determine whether to produce a payload for the first additional electronic device or the second additional electronic device; and
in accordance with a determination to produce the payload for the second additional electronic device, produce a packet that includes the payload and a header that identifies an inductive coupling path to the second additional electronic device and send the packet to the first additional electronic device.

11. The electronic device of claim 10, wherein the inductive coupling path comprises a plurality of inductive coupling links and wherein each inductive coupling link is represented by a respective digit of a destination address in the header of the packet.

12. The electronic device of claim 11, wherein the header of the packet includes a source address in addition to the destination address.

13. The electronic device of claim 12, wherein the header includes a stream number that identifies a corresponding data stream associated with the packet.

14. The electronic device of claim 10, wherein the control circuitry is configured to, during a network discovery process:
generate an internal device list that includes devices to which the electronic device is inductively coupled;
receive a device list from the first additional electronic device; and
update the internal device list based on the device list from the first additional electronic device.

15. The electronic device of claim 14, wherein the control circuitry is configured to:
use an address associated with the second additional electronic device from the internal device list to identify the inductive coupling path to the second additional electronic device in the header of the packet.

16. A non-transitory computer-readable storage medium storing one or more programs configured to be executed by one or more processors of an electronic device that is operable in a wireless charging system with at least first and second additional electronic devices, that comprises wireless power circuitry including at least one coil, and that comprises in-band communications circuitry configured to use the at least one coil to communicate with the first and second additional electronic devices, the one or more programs including instructions for:
receiving a packet from the first additional electronic device using the in-band communications circuitry, wherein the packet has a payload;
using information from the packet, determining whether to transmit the payload to the second additional electronic device using the in-band communications circuitry; and
in accordance with determining to transmit the payload to the second additional electronic device using the in-band communications circuitry, transmitting the payload to the second additional electronic device using the in-band communications circuitry.

17. The non-transitory computer-readable storage medium of claim 16, wherein the packet from the first additional electronic device includes a source address and wherein the one or more programs further include instructions for:
adding a digit to the source address to form a modified source address; and
using the in-band communications circuitry, transmitting an additional packet to the second additional electronic device that includes the payload and the modified source address.

18. The non-transitory computer-readable storage medium of claim 17, wherein the packet from the first additional electronic device includes a destination address and wherein the one or more programs further include instructions for:
removing a digit from the destination address to form a modified destination address, wherein the additional packet includes the modified destination address.

19. A non-transitory computer-readable storage medium storing one or more programs configured to be executed by one or more processors of an electronic device that is operable in a wireless charging system with at least first and second additional electronic devices, wherein the electronic device is inductively coupled to the first additional electronic device without being inductively coupled to the second additional electronic device, wherein the first additional electronic device is inductively coupled to the second additional electronic device, wherein the electronic device comprises wireless power circuitry including at least one coil, and wherein the electronic device comprises in-band communications circuitry configured to use the at least one coil to communicate with the first additional electronic device, the one or more programs including instructions for:
 determining whether to produce a payload for the first additional electronic device or the second additional electronic device; and
 in accordance with a determination to produce the payload for the second additional electronic device, producing a packet that includes the payload and a header that identifies an inductive coupling path to the second additional electronic device and sending the packet to the first additional electronic device.

20. The non-transitory computer-readable storage medium of claim 19, wherein the inductive coupling path comprises a plurality of inductive coupling links and wherein each inductive coupling link is represented by a respective digit of a destination address in the header of the packet.

* * * * *